R. H. BROWN.
IMPLEMENT FOR CUTTING AND HANDLING PRICKLY PEAR.
APPLICATION FILED JUNE 27, 1912.
1,053,005.
Patented Feb. 11, 1913.
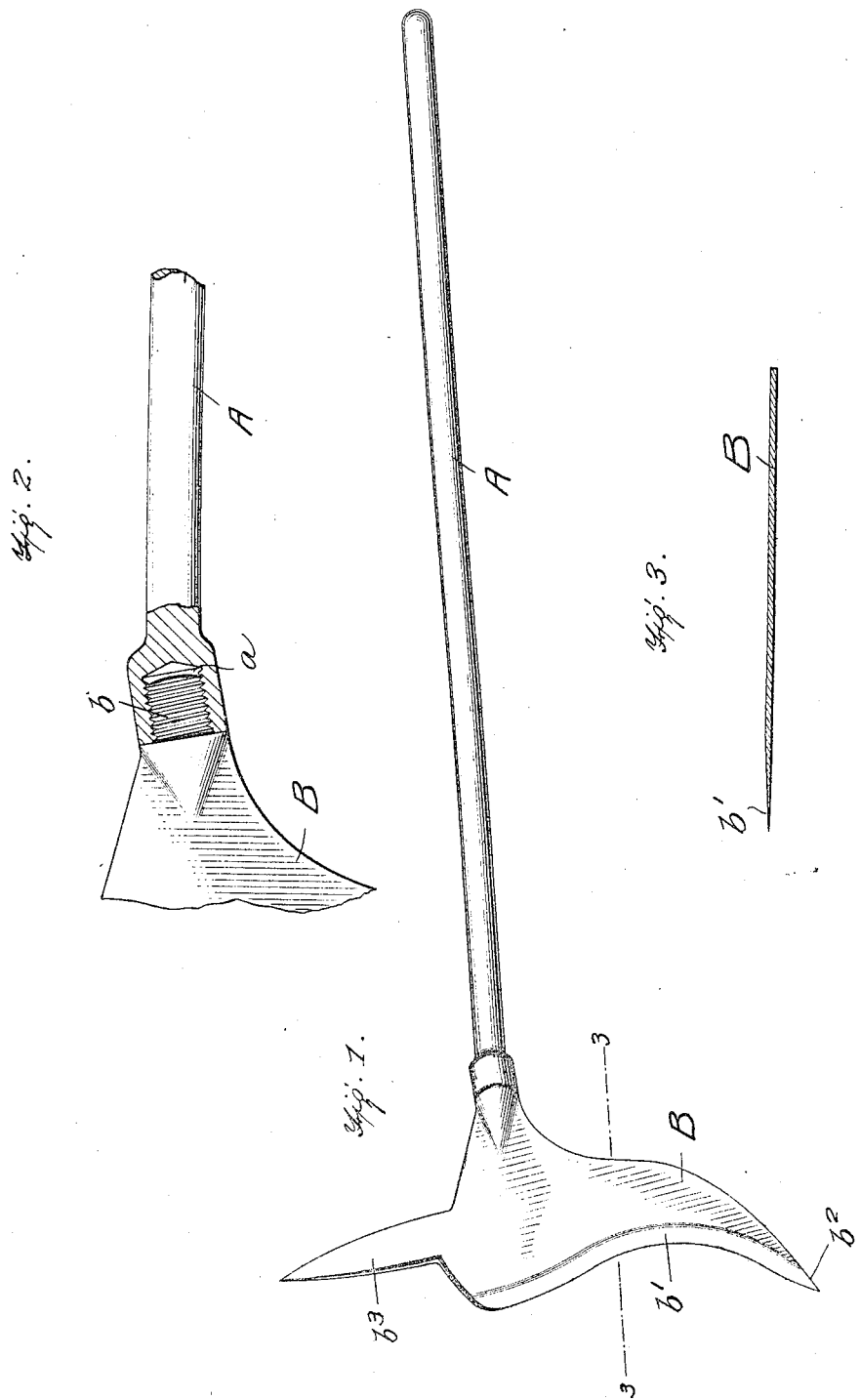
WITNESSES
L. H. Schmidt.
Myron G. Clean.
INVENTOR
ROYAL H. BROWN,
BY Munn & Co.
ATTORNEYS

UNITED STATES PATENT OFFICE.

ROYAL H. BROWN, OF EL PASO, TEXAS.

IMPLEMENT FOR CUTTING AND HANDLING PRICKLY-PEAR.

1,053,005.  Specification of Letters Patent.  Patented Feb. 11, 1913.

Application filed June 27, 1912. Serial No. 706,195.

*To all whom it may concern:*

Be it known that I, ROYAL H. BROWN, a citizen of the United States, and a resident of El Paso, in the county of El Paso and State of Texas, have invented a new and useful Improvement in Implements for Cutting and Handling Prickly-Pear, of which the following is a specification.

My present invention relates to implements for clearing the ground for purposes of cultivation, my object being to provide an implement which may be easily and quickly handled for the purpose of cutting and handling prickly pear.

Broadly, my invention consists in the provision of an implement which embodies a handle and a transversely elongated head at one end of the handle, having an outer cutting edge and an engaging prong or tine extending from one side thereof.

My invention in all its details is shown in the accompanying drawing, in which,

Figure 1 is a perspective view thereof; Fig. 2 is an enlarged plan, partly broken away and in section, of the adjoining portions of the implement head and handle; and Fig. 3 is a cross section through the head taken substantially on the line 3—3 of Fig. 1.

Referring now to these figures, my improved implement includes a handle A which is provided at one end with a threaded socket $a$ adapted to receive the threaded extension $b$ of the head B. The head B, as will be seen clearly by reference to Figs. 1 and 3 is transversely elongated and flat throughout, except for its threaded extension $b$ before-mentioned. Along its outer edge, which extends in a direction substantially at right-angles to the handle A, the head B is beveled upon opposite sides, in order to provide a cutting edge $b'$ which, as clearly shown in Fig. 1, is provided with an incurved portion and an outcurved portion, of which the latter extends to a sharpened point $b^2$ projecting in an outward direction upon one side of the plane of the handle A. From the opposite side of the head B, which is unsharpened, there extends a single flat prong or tine $b^3$, the function of which is to engage the bush or plant after the same has been cut by the cutting edge $b'$ whereby to transport the plant to any desired point without danger of the user becoming scratched or cut during the handling. To this end the prong or tine $b^3$ is provided with blunt sides which taper, however, to a sharp engaging point.

The implement as described may be easily and quickly manipulated, possesses strength and durability, and is at the same time simple and easy to manufacture and maintain in good working condition.

I claim:

1. An implement of the character described, comprising a handle, and a laterally elongated head at one end of the handle having an outer curved cutting edge terminating in a sharpened point which is presented outwardly away from the handle at one side of the head, and a prong or tine projecting from the opposite side of the head having unsharpened edges.

2. An implement of the character described, comprising an elongated handle, and a relatively flat head at one end of the handle, and elongated in a direction transverse to the said handle, said head having an outer curved cutting edge terminating in a sharpened point located upon one side of the plane of the handle and presented outwardly in a direction away from the handle, and a single prong or tine projecting from the opposite side of the said head and in a direction substantially at right-angles to the handle, said prong or tine being also flat and provided with blunt sides and a relatively sharp engaging point.

ROYAL H. BROWN.

Witnesses:
MOSES A. GOFF,
GILBREATH M. KNOX.